United States Patent [19]
Acaba

[11] 3,732,075
[45] May 8, 1973

[54] AIR POLLUTION CONTROL DEVICE

[76] Inventor: Peter Acaba, 605 East 6th Street, Apt. 1E, New York, N.Y. 10009

[22] Filed: Dec. 16, 1970

[21] Appl. No.: 98,783

[52] U.S. Cl. ............................23/284, 21/53, 21/55, 21/74 R, 23/277 C, 55/255, 55/260, 55/321, 55/334, 55/368, 55/378, 55/443, 55/467, 55/481, 261/121

[51] Int. Cl. ..............................................B01d 50/00

[58] Field of Search......................55/316, 255, 260, 55/320, 321, 323, 481, 324, 368, 334, 387, 335, 442, 443, 378, 379, 467; 110/119; 21/53, 55, 74 R; 23/284, 277 C, 288; 60/297, 311, 315, 316; 261/121; 181/72, 68, 70, 64, 36 C; 180/64 A

[56] References Cited

UNITED STATES PATENTS

| | | | |
|---|---|---|---|
| 865,189 | 9/1907 | Lamb | 55/DIG. 20 |
| 2,777,759 | 1/1957 | Sokolik | 23/2 E |
| 3,190,058 | 6/1965 | Farr et al. | 55/442 |
| 3,224,171 | 12/1965 | Bowman | 60/311 |
| 3,476,524 | 11/1969 | Burke | 23/288 F |
| 3,613,562 | 10/1971 | Brewer | 110/18 R |

*Primary Examiner*—Bernard Nozick
*Attorney*—Polachek, Saulsbury & Hough

[57] ABSTRACT

An air pollution control apparatus for removing pollutants from exhaust gases prior to discharge into the atmosphere which includes both mechanical and chemical filtering of the gases. The gases are drawn through a housing containing a plurality of spaced baffle members surrounded by a porous filter material for precipitating and trapping particulates; a chemical filter further reacts with the gases to neutralize noxious substances therein. A suction impeller in the housing is utilized for maintaining and controlling the gas flow through the filters and for discharging the purified gas through exhaust ports in the housing. The filters are furthermore advantageously removably mounted to permit for the easy disposal of pollutants collected and for replacement of the filters when necessary.

5 Claims, 6 Drawing Figures

PATENTED MAY 8 1973

INVENTOR.
PETER ACABA
BY Polachek & Saulsbury
ATTORNEYS

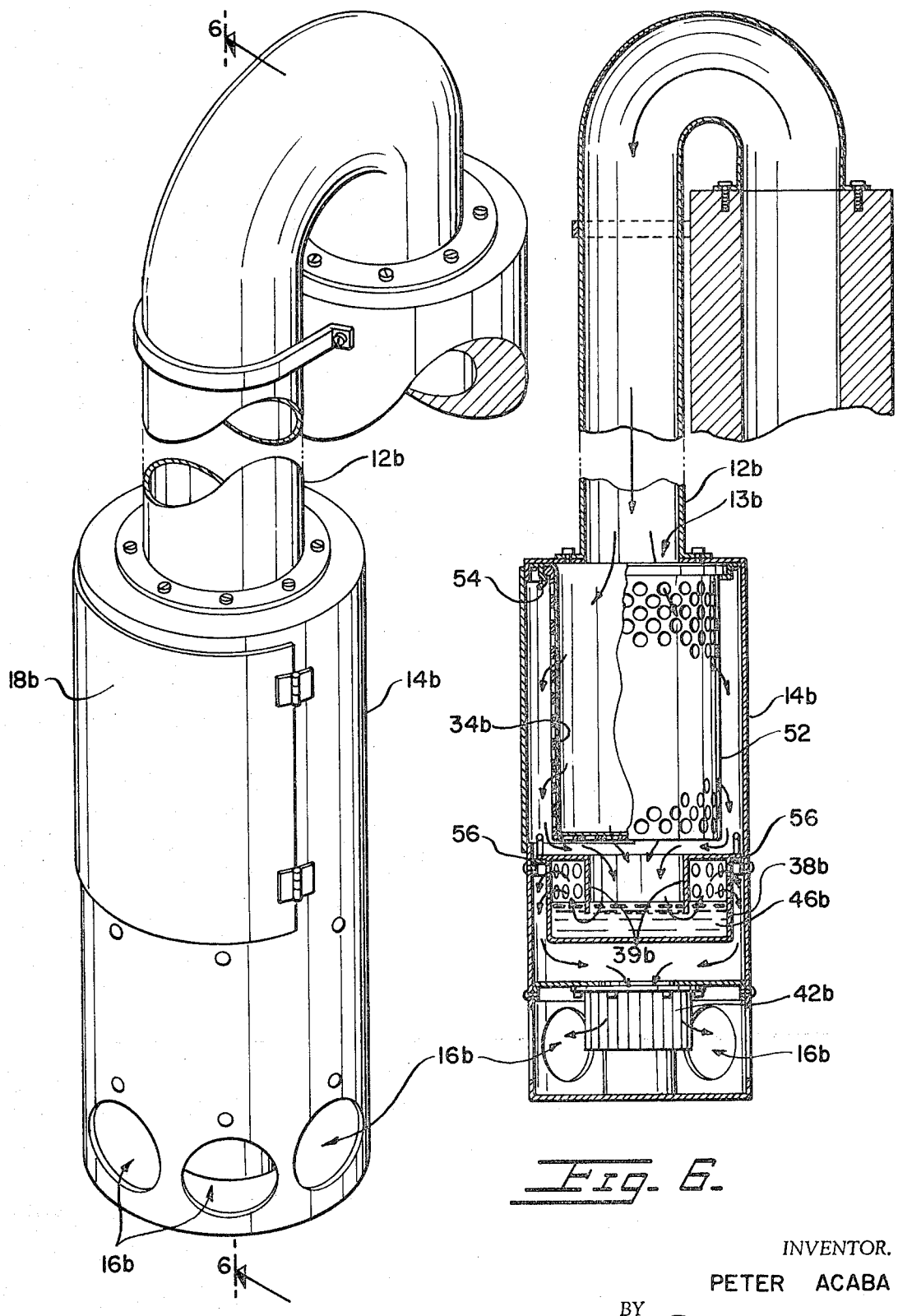

AIR POLLUTION CONTROL DEVICE

This invention relates to a pollution control device and in particular to an apparatus for removing particulates, noxious fumes and other pollutants from combustion or other exhaust gases prior to the venting of the gases into the atmosphere.

The field of ecology and the related problems of environmental control have become increasingly relevant in our society today. This is especially evident in urban and industrial centers. One of the chief areas of principal concern is that of air pollution. Various measures have been employed in an attempt to limit or otherwise control the amount of pollutants discharged into the air. Among those are the use of low sulfur fuels or fuels which can be more completely combusted and the employment of precipitators, spark arresters, electrical filtering devices, etc. In some instances, legislative measures have been required, such as the prohibition or severe restriction of refuse incineration.

The pollution control device of this invention was developed to provide an efficient and economical apparatus for alleviating pollution and is fully applicable in any pollution producing situation wherein combustion or other exhaust gases are vented into the atmosphere. The invention is directed to an apparatus adapted to be affixed to or over a discharge stack or other exhaust conduit to entrap or otherwise filter and remove from the gases, solid particulates such as dirt, dust, soot and similar contaminants. Furthermore, the exhaust gases are also passed through a chemical filter which will treat and chemically react with the gases to neutralize noxious substances and extract potentially harmful constituents such as sulphur dioxide and carbon monoxide. Additionally, the gases may be pleasantly scented or aromatized prior to discharge from the device.

The apparatus is comprised of a housing through which the polluted exhaust gases are passed. The housing includes mechanical filtering means having a plurality of spaced frusto-conical shaped baffle members or louvers forming a tortuous or serpentine flow passageway for the gases. The gases are additionally fed through porous cloth-like filter material placed over a supporting frame surrounding the baffle members. The heavier solid particulates will precipitate downwardly during the passage through the baffle members and filter material and will collect in pockets formed adjacent the filter material. Further, fine contaminents will be entrapped within the porous filter material. The porous filter material is advantageously made in the form of a bag to facilitate disposal of the collected dirt. The gases after the initial filtering, flow through a chemically treated filter material and will chemically react with the treated filter material to neutralize noxious substances prior to the venting through the exhaust ports. An impeller or fan activated by a motor is placed at one end of the housing and will create a vacuum for maintaining and regulating the flow of gases through the device.

The size, shape and location of the baffle members may be varied to provide the desired gaseous flow velocity without undue turbulence and may also be pivotally mounted to the support frame to provide for angular adjustability. The chemical filter means can be a chemically treated or impregnated porous material or a chemical in fluid form; the particular chemical to be used will, of course, depend on the nature of the exhaust gases and the noxious substances desired to be removed therefrom. The porous filter is preferably a cloth-like fabric or paper material which can be cleaned and reused or alternately may be disposed and replaced by a new filter.

It is an object therefore of the present invention to provide an air pollution control device having means therein for both mechanical and chemical filtering of gases passing therethrough.

Specifically, it is an object of the present invention to provide an air pollution control device utilizing a plurality of baffle members in conjunction with a surrounding porous fabric material for precipitating and entrapping pollutants within the gas flowing through the apparatus.

It is a further object of the present invention to provide an air pollution control device wherein the gases passing therethrough are also chemically treated to remove noxious substances therein prior to venting.

Another object of this invention is to provide an air pollution control device utilizing a suction impeller for maintaining and regulating the flow of gases therethrough.

Still another object of this invention is to provide an air pollution control device wherein the filter means are removably mounted and readily accessible to permit disposal of the pollutants collected therein and facilitate replacement of the filters.

Yet another object of this invention is to provide an air pollution control device wherein the gases are scented or otherwise aromatized prior to venting.

The above and other objects, features and advantages of the present invention will be apparent from the following description of the preferred embodiments when considered in connection with the accompanying drawings.

In the accompanying drawings in which are shown some of the various possible embodiments of the invention:

FIG. 1 is a perspective view of the air pollution control device of this invention shown affixed to an exhaust conduit and further shows an access door in the open position and a porous cloth-like filter material secured therein by means of an annular clamp.

FIG. 2 is a sectional view to a slightly enlarged scale taken along line 2—2 of FIG. 1 and shows in detail a plurality of spaced frusto-conical baffle members or louvers supported by a frame member which in turn is surrounded by a porous cloth-like bag shaped filter; additionally, a chemical filter is mounted above the baffle members and a suction impeller is included within the housing for drawing the exhaust gases through the filters and for venting same into the atmosphere.

FIG. 3 is an auxiliary sectional view to a slightly enlarged scale showing the arrangement of the frusto-conical annular baffle members affixed to the supporting frame, the porous cloth-like bag shaped filter envelopes the frame and is securely clamped thereto by means of an annular clamp; handles are provided on the support frame to permit removal of the same as an integral unit from the device through the access door opening.

FIG. 5 is a perspective view of an alternate embodiment wherein the exhaust gases are channeled through the device to be purified and discharged therefrom.

Figures 1, 2, 3, 4:
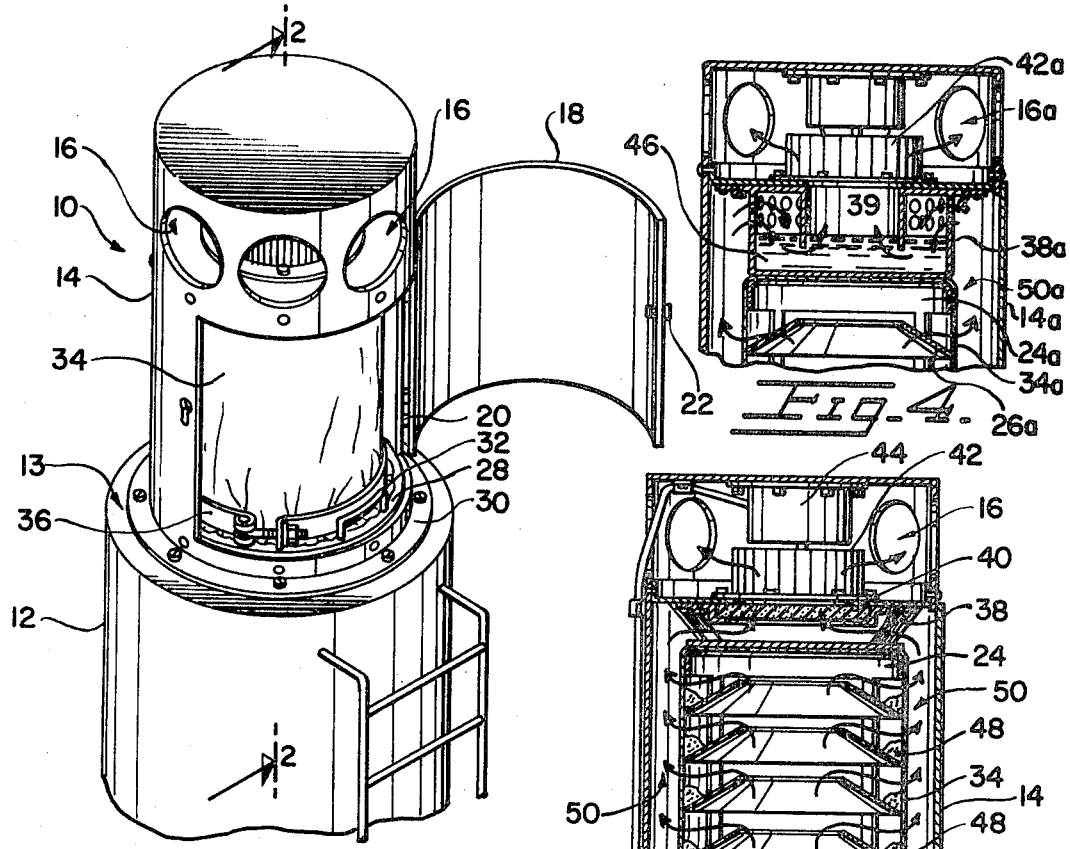
FIG. 4 is a partial sectional view of a modified embodiment wherein a vessel is provided having a plurality of apertures along its upper wall surface, said vessel containing a fluid for chemically reacting with the exhaust gases prior to discharge through the exhaust ports.

FIG. 6 is a sectional view to a slightly smaller scale taken along line 6—6 of FIG. 5 which shows a filtering chamber or canister having a porous material filter lining the inner surface thereof, the chamber has apertured walls for permitting passage of the gases therethrough; the device is also provided with a vessel having an apertured wall surface, said vessel containing a fluid for chemically reacting with the exhaust gases prior to venting through the exhaust ports.

Referring now in detail to the drawings, the reference numeral 10 denotes generally the air pollution control device of this invention. The air pollution control device 10 as shown in FIG. 1 is affixed to a stack or exhaust conduit 12 at an open end 13 thereof in order to filter and treat the exhaust or combustion gases prior to the venting of same into the atmosphere. The gases are passed through a housing 14, preferably cylindrical in shape and constructed of a durable heat resistant and weatherproof material. The housing 14 is provided with exhaust ports 16, an inlet opening 17, and an access door 18 secured by means of hinges 20 and a latch 22. The interior of the housing 14 accommodates a support frame 24 which is designed to hold and positionally fix a plurality of spaced frusto-conical baffle members or louvers 26 in a generally stacked configuration as shown in FIGS. 2 and 3. The lower portion of support frame 24 contains a flared out portion forming a base 28 adapted to rest on a mounting bracket 30. The mounting bracket 30 is used to secure the housing 14 to the stack 12. The base 28 contains handles 32 for facilitating removal of the support frame 24. A porous filter comprised of an open-weave, mesh or fibrous cloth-like or paper material 34, is preferably made to conform to the shape of support frame 24 and to envelope said frame in a bag-like fashion. The porous filter material 34 is secured to the frame 24 by means of an annular clamp 36 as most clearly shown in FIG. 1. The filter material 34 may be of any suitable composition including paper, the prime requisite being that the porous material should be pervious to air, but substantially impervious to the particulates contained within the gases. Above the support frame 24 is positioned an apertured casing 38 containing a chemically treated or impregnated filter 40. The treated filter 40 is adapted to chemically react with the gases passing therethrough to extract noxious substances and to neutralize harmful fumes. It should be apparent therefore that the particular chemical used will be dependent to an extent on the nature of the gas being passed therethrough and the particular substance desired to be removed therefrom.

Additionally, the filter 40 may be treated with chemicals for aromatizing the gases prior to venting into the atmosphere. For this purpose, naptha derivatives, pine scented substances or other aromatic compounds may be applicable.

The exhaust or combustion gases are drawn through the air pollution control device 10 by means of a suction impeller 42 mounted within the housing 14 directly above the chemically treated filter 40. The suction impeller 42 is operated by a motor 44, and in this particular instance, electrically driven. The purified air is vented through exhaust ports 16 formed around the upper surface of the housing 14.

In operation, the exhaust or combustion fumes rising from the stack or conduit 12 will enter the air pollution control device 10 and flow in a tortuous or serpentine path (indicated by arrows) between and around the plurality of baffle members 26, eventually passing through the porous filter material 34. In this initial stage of the filtering process the particulates contained within the gases such as dirt, dust, soot and other particles will precipitate out and collect between the baffle member 26 and filter material 34. The contaminants so removed are deposited in pockets 48 formed around the periphery of the baffle member 26 and indicated by reference numeral 48. These pockets 48 advantageously prevent the contaminants from falling back down the conduit 12. After passing through the initial filtering stage the exhaust gases will flow in the annular passageway 50 formed between the filter material 34 and the housing 14 upwardly and through the apertured casing 38 and chemically treated filter 40. In this final filtering stage the noxious substances within the gases will be removed by chemically reacting with the filter 40. The purified gas will continue to flow upwardly because of the suction created by impeller 42 and will eventually be vented through the exhaust ports 16.

It should be noted that both the mechanical and chemical filters are readily accessible for cleaning and replacement and the frame 24 and filters may be removed from the housing by way of access door 18.

The FIG. 4 illustrates a modified embodiment wherein like numerals are used to represent like parts in the corresponding figures, and the suffix letter *a* has been used to designate like parts in this embodiment. The final filtering stage has been altered in this embodiment and a vessel 38a is secured along its upper surface to the housing 14a in a manner which will permit flow of exhaust gases therethrough. The vessel 38a is designed to contain a chemical 46 in fluid form. A depending wall surface 39 is placed within the vessel 38a for guiding the gas flow into contact with the fluid 46. The device will function in a manner similar to that described with reference to FIGS. 1 through 3.

An alternate embodiment of this invention is illustrated in FIGS. 5 and 6 wherein like numerals are used to represent parts in the corresponding figures and the suffix letter *b* will be used to designate like parts in FIGS. 5 and 6. In this embodiment the device is designed for attachment to an exhaust conduit or stack 12b having an opening 13b facing in a generally downward direction. A housing 14b is provided with an access door 18b and exhaust ports 16b along the lower surface of the housing 14b. The initial filtering takes place within an apertured container or canister 52 in lieu of baffle members previously described. The apertured container 52 which is lined with a porous filter material 34b. The container 52 is resiliently held against the stack opening 13b by means of a retaining clip 54. The container 52 may be easily removed from within the housing 14b by way of access door 18b. The porous filter material 34b is preferably constructed in a baglike fashion so that is may be removed to dispose of the collected contaminents therein or replaced with another filter 34b. The final stage of filtering takes place with the passage of the gases through a chemical 46b contained within an apertured vessel 38b releasably mounted on bracket 56. The vessel 38b has depending walls 39b for guiding the gas flow therethrough. A suction impeller 42b will vent the purified gases through exhaust ports 16b and into the atmosphere. The vessel 38b can be removed by way of access door 18b to add or change the chemical fluid 46b.

The above cited embodiments are intended as exemplary and while they have described the invention with specific implementation thereof, other modifications and various changes might be made in the embodiment as so set forth and will be apparent to those skilled in the art.

It should therefore be understood that all material herein described and shown in the accompanying drawings is to be interpreted as illustrative and not in a limiting sense.

What is claimed is:

1. An air pollution control device including means for both mechanical and chemical filtering of exhaust gases discharged from an open ended exhaust conduit prior to venting into the atmosphere, comprising a housing having means defining an inlet opening, and an exhaust opening, fastening means for securing the housing to the conduit with the inlet opening positioned over the open end of the conduit, means within the housing for creating a gas flow through the housing and out the exhaust opening, mechanical filter means mounted within the housing across the path of the gases for removing and entrapping particulates in the gases, and pollutant chemically-reactive filter means mounted within the housing adjacent the exhaust opening for neutralizing noxious substances within the gases, said mechanical and chemical filter means being accessible to permit removal thereof from within the housing when contaminated by pollutants, the mechanical filter means being comprised of support frame, a plurality of baffle members attached to said frame in a spaced relationship from each other, and from the housing, the baffle members being frusto-conical in shape and being spaced in a stacked configuration to form pockets for preventing the entrapted particulates from falling into the open end of the exhaust conduit, the mechanical filter means further including a porous material filter enveloping the support frame and surrounding the baffle members, said material being pervious to air but substantially impervious to particulates contained within the gases, and further including clamping means for removably securing the porous material filter to the support frame.

2. An air pollution control device as claimed in claim 1, wherein the chemical filter means comprises a chemically treated porous material within the housing and interposed in the flow path between the mechanical filter means and the exhaust port, said chemically treated filter material being adapted to chemically react with the gases passed therethrough to remove noxious substances within said gases.

3. An air pollution control device as claimed in claim 1, wherein chemical filter means contains an aromatic compound and is adapted to scent the purified air.

4. An air pollution control device including means for both mechanical and chemical filtering of exhaust gases discharged from an open ended exhaust conduit prior to venting into the atmosphere, comprising a housing having means defining an inlet opening, and an exhaust opening, fastening means for securing the housing to the conduit with the inlet opening positioned over the open end of the conduit, means within the housing for creating a gas flow through the housing and out the exhaust opening, mechanical filter means mounted within the housing across the path of the gases for removing and entrapping particulates in the gases, and pollutant chemically-reactive filter means mounted within the housing adjacent the exhaust opening for neutralizing noxious substances within the gases, said mechanical and chemical filter means being accessible to permit removal thereof from within the housing when contaminated by pollutants, the mechanical filter means being comprised of support frame, a plurality of baffle members attached to said frame in a spaced relationship from each other, and from the housing, the mechanical filter means further including a porous material filter enveloping the support frame and surrounding the baffle members, said material being pervious to air but substantially impervious to particulates contained within the gases said baffle members being positioned for channelling portions of the gases to the mechanical filter means and for collecting pollutant particulates filtered out by the porous material filter.

5. An air pollution control device as claimed in claim 4, wherein the baffle members are frusto-conical in shape and are spaced in a stacked configuration to form pockets for preventing the entrapped particulates from falling into the open end of the exhaust conduit.

* * * * *